United States Patent [19]

Suzuka

[11] 4,359,770
[45] Nov. 16, 1982

[54] BIT BUFFER SYSTEM

[75] Inventor: Kazuo Suzuka, Sayama, Japan

[73] Assignee: Hitachi Denshi Kabushiki Kaisha, Tokyo, Japan

[21] Appl. No.: 133,611

[22] Filed: Mar. 24, 1980

[30] Foreign Application Priority Data

Mar. 26, 1979 [JP] Japan .................................. 54-34339

[51] Int. Cl.³ .............................................. H04J 3/06
[52] U.S. Cl. ..................................... 370/108; 375/119; 370/100
[58] Field of Search ................. 370/108, 100; 375/118, 375/119

[56] References Cited

U.S. PATENT DOCUMENTS 3,908,084 9/1975 Wiley .................................. 370/108
4,045,618 8/1977 Lagarde et al. ..................... 370/100

*Primary Examiner*—Douglas W. Olms
*Attorney, Agent, or Firm*—Charles E. Pfund

[57] ABSTRACT

A bit buffer system wherein transmission data signals are sequentially stored in a shift register having a predetermined number of stages, the transmission data signal is taken out of a substantially central one of the predetermined number of stages at the time of initialization to be sent to a receiving unit, and the phase difference between the timing pulse controlling the period of the transmission data signal and the timing pulse controlling the operation of the receiving unit to select a specified stage of the shift register so as to take out the transmission data signal therefrom according to a detected phase difference. A specified code contained in the transmission coded data signal is detected to effect the initialization.

10 Claims, 8 Drawing Figures

BIT BUFFER SYSTEM

BACKGROUND OF THE INVENTION

This invention relates to a bit buffer system used when a plurality of coded data signals are multiplexed.

Since, when a plurality of coded data signals are multiplexed, there is no predetermined synchronous relation between each coded data signal and a multiplexed signal, a bit buffer system is generally utilized for matching different timing between the coded data signal and the multiplexed signal in order to multiplex the coded data signals each of which runs on on the basis of independent timing.

The drawbacks of the conventional system are first described with reference to FIGS. 1 to 4. As shown in FIG. 1, coded data signals $SD_1$ transmitted from a data terminal apparatus or the like are sent to a bit buffer BB through an interface IF and, further, a timing pulse $ST_1$ which controls the period of transmission data signals $SD_1$ and a transmission request signal RS which is generated concurrently with the transmission data signals $SD_1$ and which instructs the transmission to a multiplexor MP or a receiving unit are taken out via the interface IF.

The bit buffer BB comprises a shift register SR having a predetermined stages, 8 stages #1 to #8 in this example, and sequentially stores 8 bits of transmission data signals $SD_1$ in accordance with the timing pulse $ST_1$. Either one of outputs of #1 to #8 stages of the shift register SR is selected by a data selector DS. At the time of initializing to be described later, a transmission data signal $SD_1$ is taken out of either #4 or #5 stage which corresponds to a substantial central stage and supplied to the multiplexor MP as a coded data signal $SD_2$.

The data selector DS is controlled by the output from an up-down counter CT (termed as U/D counter hereinafter) to select a specified stage of the shift register SR from which the transmission data signal $SD_1$ is taken out. The U/D counter is adapted to count either up "U" or down "D" count stepwise according to the phase difference between the timing pulse $ST_1$ and a timing pulse $ST_2$ controlling the operation of the multiplexor MP.

More particularly, the phase difference between the timing pulses $ST_1$ and $ST_2$ is detected by a phase detector PD such as a phase comparator and when the phase of the timing pulse $ST_2$ leads the timing pulse $ST_1$, one down-output D is produced from the phase detector PD at the time when a predetermined relation occurs between $ST_1$ and $ST_2$ as will be described later while, on the other hand, when the phase of the timing pulse $ST_2$ lags, one up-output U is produced at the time when another predetermined relation between $ST_1$ and $ST_2$ takes place, whereby the U/D counter carries out up "U" or down "D" count for one step.

The U/D counter CT is preset for initializing by a preset pulse which is produced from a pulse generator PG when it detects the leading edge of the transmission request signal RS. In the example shown in the figure where a binary counter of 3 bits is utilized, this counter is so initialized that the count output is made a binary of either 1.0.0. or 1.0.1, in other words either 4 or 5 in decimal, to control the data selector DS, and a transmission data signal $SD_1$ is taken out of the stage #4 or #5 of the shift register SR.

Accordingly, the bit buffer BB operates as shown in time charts of FIGS. 2 and 3 to achieve the intended purpose. This will be described in more detail. FIG. 2 shows the case where the period of the timing pulse $ST_2$ is shorter than that of $ST_1$ and the timing pulse $ST_2$ leads $ST_1$. It is assumed that bits A to F of the transmission coded data signals are sequentially stored in the shift register SR according to the timing pulse $ST_1$ and taken out from the stage #4. Since the transmission coded data signal is converted into a transmission output SM by fall of the timing pulse $ST_2$, bits A and B are converted into normal transmission outputs SM but at bit C, the fall takes place twice within the period of bit C because one period of $ST_2$ is confined in one period of $ST_1$. Therefore, as indicated in the figure at (SM), the bit C is transmitted twice causing errors in transmission.

However, when the fall of the timing pulse $ST_2$ takes place for the first time at low level (termed as "L" hereinafter) of the timing pulse $ST_1$, the phase detector PD generates a down-output D to shift the specified stage of the shift register SR from which the transmission coded data signal $SD_1$ is taken out by the data selector DS, from stage #4 to stage #3 in this example. As a result, due to the fact that bit C has been stored in the stage #4 and the following bit D in the stage #3, the bit D can be taken out and transmitted following the bit C as shown in the figure at SM, thereby preventing the erroneous transmission.

In the case where the period of $ST_2$ is larger than that of $ST_1$ and the phase thereof lags, the fall does not take place at the bit D of the transmission coded data signal $SD_1$ as shown in FIG. 3 and, therefore, if it were transmitted as it is, the bit D would be dropped as shown in the figure at (SM) to cause erroneous transmission. The erroneous transmission is avoided in a manner that the phase detector PD generates an up-output U when the fall of the timing pulse $ST_2$ first takes place at high level (termed as "H" hereinafter) of the timing pulse $ST_1$ to shift the specified stage of the shift register SR from stage #4 to stage #5 so as to take out the preceding bit D stored in the stage #5 and to transmit the bit D following the bit C as shown as SM, thereby ensuring the normal transmission.

The prior art bit buffer BB operates and carries out the matching operation between the transmission data signal $SD_1$ and the transmission output SM of which timings are different from each other in a manner described in the foregoing. However, since the aforementioned operation is repeated to shift the specified stage from which the transmission coded data signal $SD_1$ is taken out repeatedly toward stage #1 or #8 as far as the frequency difference between the timing pulses $ST_1$ and $ST_2$ is constant, the specified stage eventually reaches either the stage #1 or the stage #8 and can not proceed any more, causing such a defective transmission as transmitting the same bit repeatedly as shown in FIG. 2 at (SM) or as bit missing as shown in FIG. 3 at (SM).

More particularly, as shown in FIG. 4, if initialization IR starts only when the transmission request signal RS shifts from "L" to "H" and if the frequency difference between the timing pulses $ST_1$ and $ST_2$ is constant, a period t for which erroneous transmission ER takes place is determined by the frequency difference. The erroneous transmission takes place repeatedly at the period t starting from the initialization IR. Then, even if erroneous transmission does not take place in a group $DT_1$ of the data bits, erroneous transmission ER does take place in a group $DT_2$ of the data bits given as shown in the figure.

The erroneous transmission can be avoided if a predetermined number of the stages of the shift register SR is increased, but it not only complicates the system but also pushes up the cost, resulting in undesirable disadvantages in practice. It can also be avoided by dividing the transmission coded data signal $SD_1$ and turning on or off the transmission request signal RS each time that the divisional group of transmission data signal occurs for sending all the data bit groups at the same initialization timing as the bit group $DT_1$. But this expedient will inconveniently prolong the time required for transmission as well as reduce the operational efficiency of the system and the transmission line circuit.

SUMMARY OF THE INVENTION

This invention aims at thoroughly eliminating the above conventional drawbacks and providing a bit buffer system which can eliminate erroneous transmission.

The bit buffer system according to this invention is characterized in that the initialization is effected when a predetermined code included in a transmission coded data signal is detected or when the predetermined code is taken out from the shift register after the detection thereof.

DESCRIPTION OF PREFERRED EMBODIMENTS

Figure 5:
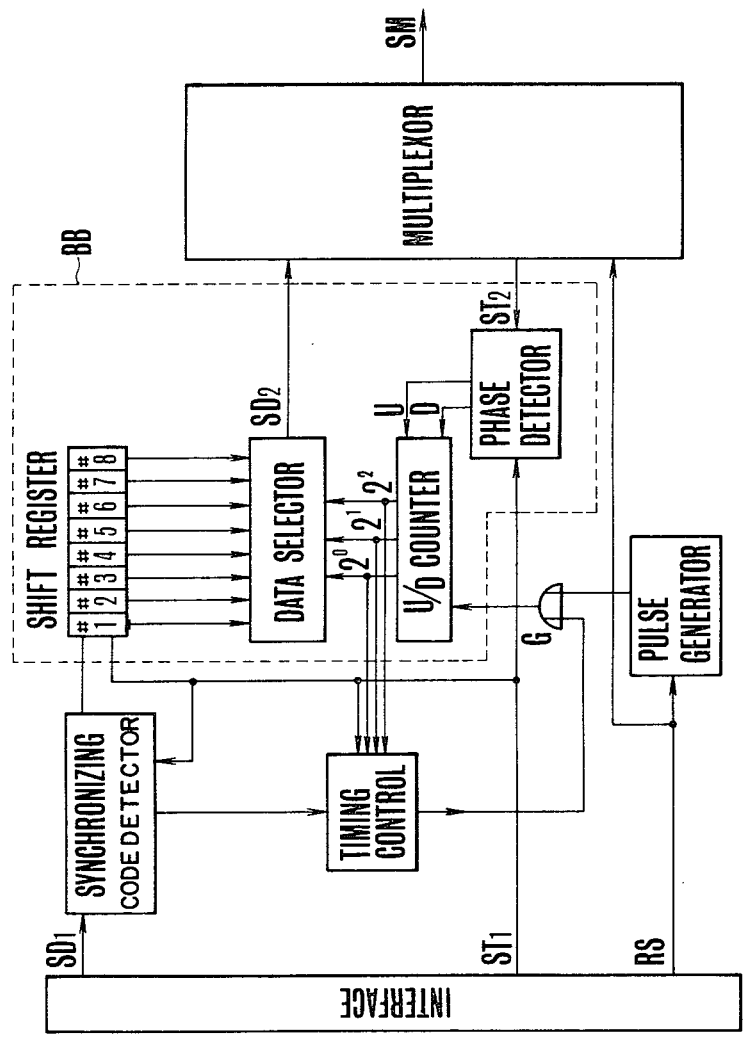
FIG. 5 is a block diagram showing an embodiment of this invention.

Referring to FIG. 5 showing an embodiment of this invention, there is provided a bit buffer system comprising a synchronizing code detector SCD which detects a synchronizing code out of the transmission data signal $SD_1$, and a timing control TC which temporarily holds and then transmits the detection output from the synchronizing code detector SCD based upon the count output from an U/D counter. The output of the timing control TC along with the output from a pulse generator PG is supplied to U/D counter as a preset pulse through an OR gate G.

More particularly, the timing control TC comprises a decoder which decodes the count output from the U/D counter CT, and a shift register. The detection output from the synchronizing code detector SCD is shifted through the stages of the shift register according to the timing pulse $ST_1$, namely held temporarily, and delivered out of the timing control TC in accordance with a predetermined count output from the U/D counter CT and transmitted to the OR gate. Therefore, when the synchronizing code detected by the synchronizing detector SCD is taken out by the data selector DS following being stored in the shift register SR of the bit buffer BB, the timing control TC sends out the output pulse thereof to forcibly preset the U/D counter for initialization.

For more stable operation, the synchronizing code detector SCD is preferably adapted to generate the detection output when receiving two or more successive synchronizing codes. In this case, the synchronizing code detector SCD is provided with a counter or a double synchronizing code detection circuit so as to generate the detection output only when it detects two synchronizing codes successively.

Figure 6:
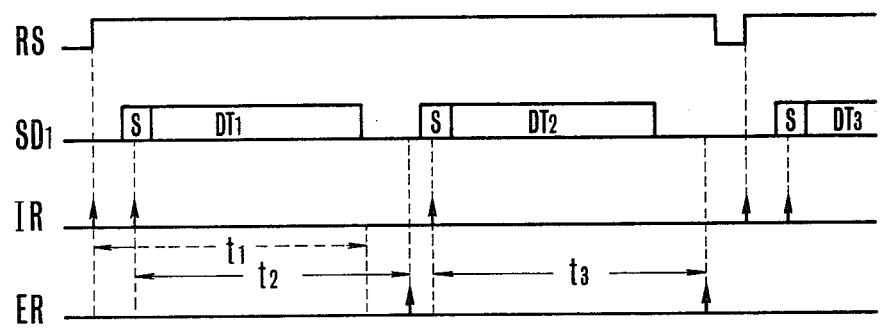
FIG. 6 is a time chart to show one example of avoidance of erroneous transmission according to this invention.

Thus, as shown in FIG. 6, if a synchronizing code S is added to the head of the transmission data signal $SD_1$, the initializations IR take place when two synchronizing codes S are taken out of the shift register SR after the two synchronizing codes are detected successively following the rise from "L" to "H" of the transmission request signal RS. Accordingly, even if erroneous transmissions ER occur at period t starting from these points, since a period $t_2$ starts before the preceding period $t_1$ ends and the data bit group $DT_1$ of the transmission data signal $SD_1$ ends before the end of the period $t_2$, the generation of the erroneous transmission ER becomes irrelevant to the transmission of the data bit group $DT_1$ at all and, thereby, a correct transmission of the data bit group $DT_1$ is carried out.

This is also applicable to the data bit group $DT_2$.

Figure 1:
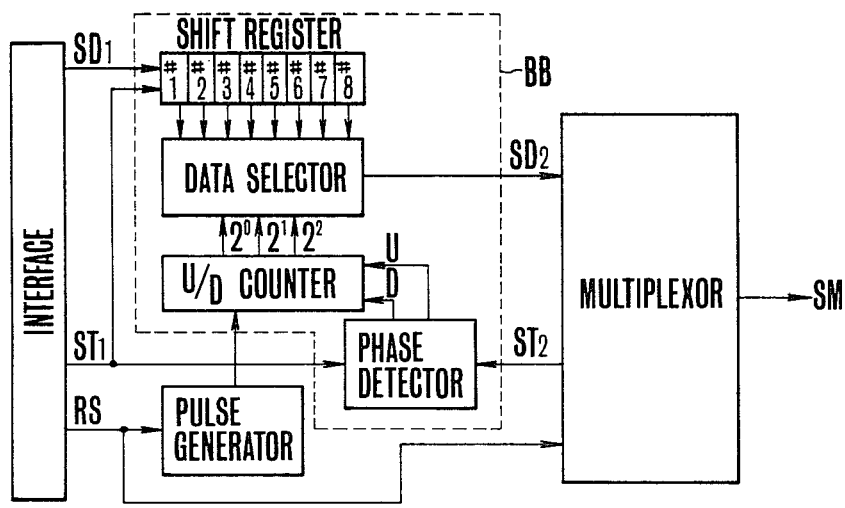
FIG. 1 is a block diagram of a prior art bit buffer system.
Figure 2:
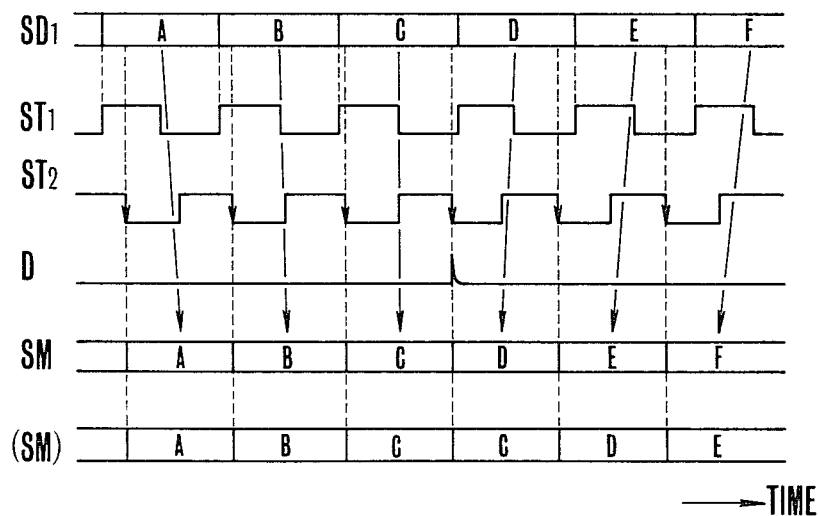
FIGS. 2 and 3 are time charts useful in explaining the operation of the bit buffer system shown in FIG. 1.
Figure 3:
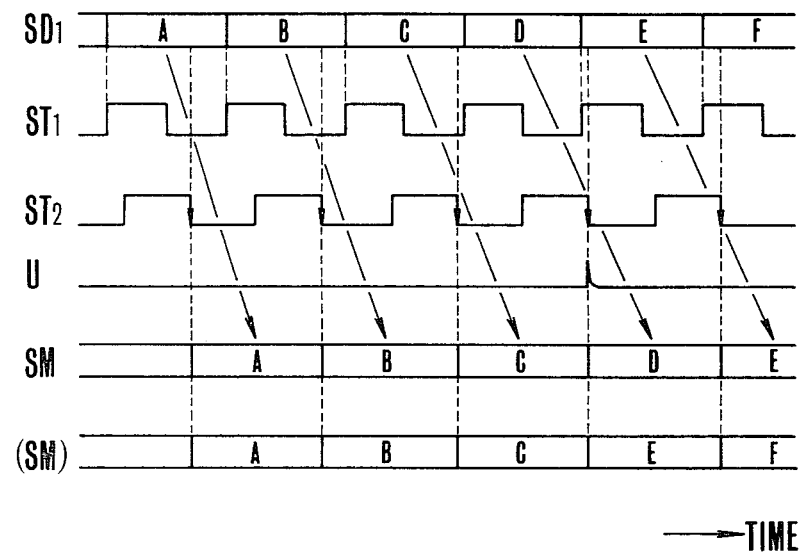
Figure 4:
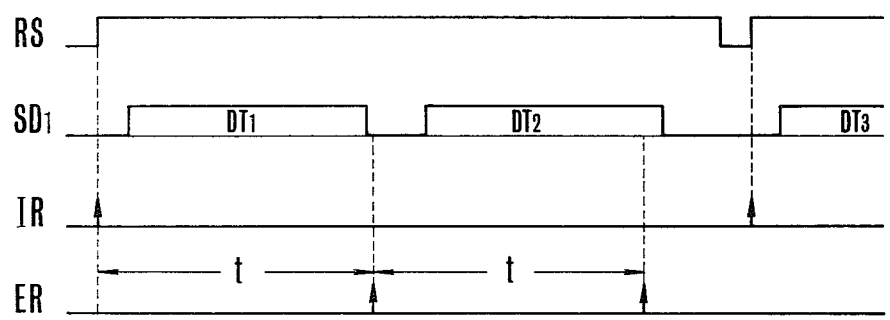
FIG. 4 is a time chart to show a condition under which erroneous transmission takes place in the system shown in FIG. 1.

Since the initialization IR takes place when the synchronizing code S is taken out of the shift register SR and converted into the transmission output SM shown in FIGS. 2 and 3, the synchronizing code S is stored at a stage which is to be selected newly from the stages #1 to #8 even if the specified stage is changed by the data selector DS. Accordingly, the initialization IR is carried out without exerting any influence on the data bit groups $DT_1$ and $DT_2$ at all.

Figure 7:
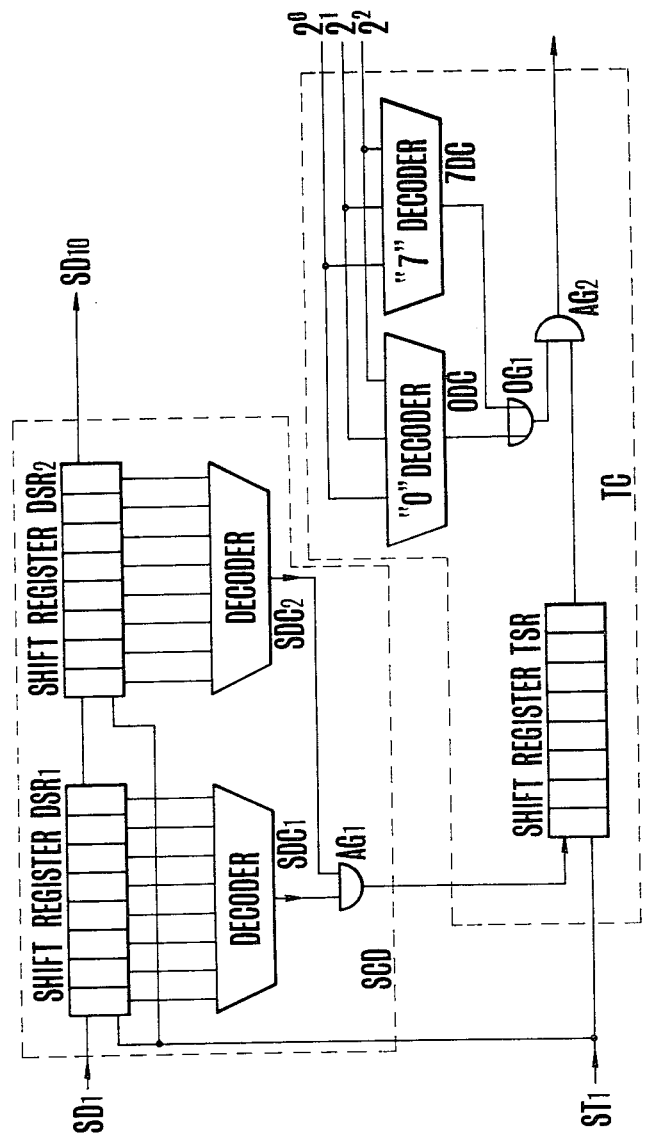
FIG. 7 is a circuit diagram to show details of the embodiment of the FIG. 5.

FIG. 7 is a circuit diagram to show details of the construction of synchronizing code detector SCD and timing control TC. The above operations, detection and temporary holding of the synchronizing code and initialization, will be described below with the reference to the figure.

Bits of transmission data signal $SD_1$ applied to the synchronizing code detector SCD are successively stored in a shift register $DSR_1$ in accordance with the timing pulse $ST_1$, the serial output of the shift register $DSR_1$ is relayed to a shift register $DSR_2$, and output $SD_{10}$ of the shift register $DSR_2$ is applied to the bit buffer BB.

Parallel outputs derived from respective stages of the shift registers $DSR_1$ and $DSR_2$ are fed to associated decoders $SDC_1$ and $SDC_2$ for decoding two synchronizing codes S. When the two synchronizing codes are simultaneously stored in the shift registers $DSR_1$ and $DSR_2$, that is, when two successive synchronizing codes are received, outputs are simultaneously produced from the decoders $SDC_1$ and $SDC_2$ to enable an AND gate $AG_1$. The output of the AND gate $AG_1$ is applied to one input of the timing control TC and fetched by a shift register TSR in response to the timing pulse $ST_1$. The shift register TSR has the same number of stages as the shift register $DSR_2$. Accordingly, the input to the shift register TSR is delayed corresponding to the number of stages and thereafter delivered out of the register TSR so as to be fed to an AND gate AG₂.

Decoders 0DC and 7DC are provided for decoding three bits representative of 0 and 7 in decimal from the U/D counter CT of bit buffer BB. Outputs of the decoders 0DC or 7DC are applied to an OR gate OG₁ to enable the AND gate AG₂ when the three-bit output of the U/D counter CT is 0 or 7, thereby producing an output for presetting the U/D counter.

Obviously, if the shift register SR of the bit buffer BB is also used as the shift register DSR₂, the delay shift register TSR of the timing control TC can be despensed with, thus simplifying the circuit construction.

Figure 8:
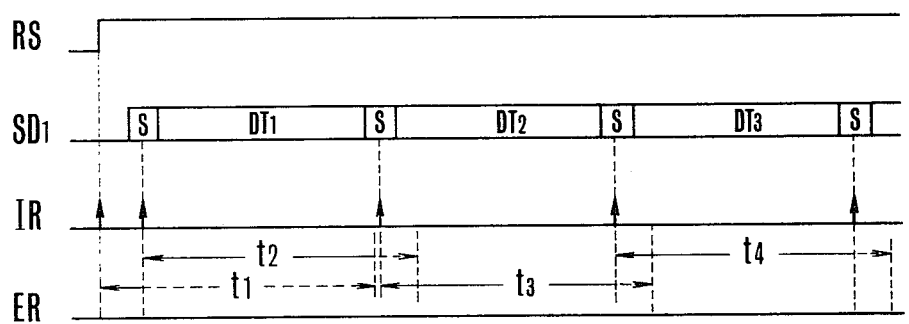
FIG. 8 is a time chart to show another example of avoidance of erroneous transmission according to this invention.

FIG. 8 shows the case when the transmission coded data signal SD₁ continues for a long time. In this case, the initialization IR is made to take place prior to the end of the period of erroneous transmission by inserting successive synchronizing codes S in the data bit groups DT₁ to DT₄ at predetermined intervals.

The initialization IR may also be effected by using, apart from the synchronizing code S, a mark code which is used as an idle code with successive 8 or more bits or a specific code representative of a condition where a space for one bit is included every 8 bits.

A similar effect can be obtained by using a flag code used in HDLS (High Level Data Link Control) transmission control procedure (ISO TC 97/SC6 and others) as a specified code.

As the receiving unit, various devices can be used besides the multiplexor MP and this invention is applicable to other various systems which transmist coded data signals SD₁ at different timings. The interface may be omitted depending on existing conditions and the construction shown in FIG. 5 may be modified variously.

As described in the foregoing, the initialization can be carried out without influencing the data bits, according to the present invention, for not only the case where the transmission data signal is continuously transmitted for a long time with transmission request signal turned on but also for the case where it is transmitted intermittently. Moreover, since the initialization is securedly carried out before the generation of erroneous transmission, the purpose is attained without increasing the number of stages of the shift register in the bit buffer. The present invention which fully eliminates the generation of the erroneous transmission can be applied effectively to bit buffers for various data signals.

What is claimed is:

1. In a bit buffer system wherein transmission data signals are sequentially stored in a shift register with a predetermined number of stages, the transmission data signal is taken out from a substantially central one of the predetermined number of stages of said shift register upon initialization to be sent to a receiving unit, the phase difference between the timing pulse controlling the period of said transmission data signal and the timing pulse controlling the operation of said receiving unit is detected to select a specified stage of said register so as to take out said transmission data signal therefrom according to a detected phase difference, the improvement which comprises means detecting a specified code contained in said transmission data signal for carrying out said initialization.

2. A bit buffer system as recited in claim 1 wherein the specified code comprises two or more successive synchronizing bits.

3. A bit buffer system as recited in claim 1 wherein the specified code comprises a mark code with successive 8 or more bits.

4. A bit buffer system as recited in claim 1 wherein the specified code comprises a condition where a space for one bit is included every 8 bits.

5. A bit buffer system as recited in claim 1 wherein the specified code comprises a condition representative of succession of two or more flag codes in HDLC transmission control procedure.

6. In a bit buffer system wherein transmission data signals are sequentially stored in a shift register with a predetermined number of stages, the transmission data signal is taken out from a substantially central one of the predetermined number of stages of said shift register upon initialization to be sent to a receiving unit, the phase difference between the timing pulse controlling the period of said transmission data signal and the timing pulse controlling the operation of said receiving unit is detected to select a specified stage of said register so as to take out said transmission data signal therefrom according to a detected phase difference, the improvement which comprises means for carrying out said initialization when a specified code contained in said transmission data signal is taken out of said shift register following the detection of the specified code.

7. A bit buffer system as recited in claim 6 wherein the specified code comprises two or more successive synchronizing bits.

8. A bit buffer system as recited in claim 6 wherein the specified code comprises a mark code with successive 8 or more bits.

9. A bit buffer system as recited in claim 6 wherein the specified code comprises a condition where a space for one bit is included every 8 bits.

10. A bit buffer system as recited in claim 6 wherein the specified code comprises a condition representative of succession of two or more flag codes used in HDLC transmission control procedure.

* * * * *